United States Patent

Wilkinson

[11] Patent Number: 6,018,596
[45] Date of Patent: Jan. 25, 2000

[54] METHOD AND APPARATUS FOR PROCESSING AN INPUT IMAGE

[75] Inventor: James Hedley Wilkinson, Tadley, United Kingdom

[73] Assignees: Sony Corporation, Tokyo, Japan; Sony United Kingdom Limited, Weybridge, United Kingdom

[21] Appl. No.: 08/816,154

[22] Filed: Mar. 12, 1997

[30] Foreign Application Priority Data

Mar. 20, 1996 [GB] United Kingdom ............ 9605871

[51] Int. Cl.$^7$ ........................................ G06K 9/40
[52] U.S. Cl. ................ 382/260; 382/270; 382/275
[58] Field of Search ................... 382/117, 263, 382/264, 270, 260, 274, 275, 291, 324; 358/461; 348/251, 254, 184; 341/122; 364/724

[56] References Cited

U.S. PATENT DOCUMENTS

| 4,578,667 | 3/1986 | Hollister ................................ 341/122 |
| 4,691,292 | 9/1987 | Rothweiler .......................... 364/724.13 |
| 4,962,426 | 10/1990 | Naoi et al. ............................. 348/623 |
| 5,754,222 | 5/1998 | Daly et al. .............................. 348/184 |

FOREIGN PATENT DOCUMENTS

| 2092404 | 8/1982 | United Kingdom . |
| 2189366 | 10/1987 | United Kingdom . |
| 2237161 | 4/1991 | United Kingdom . |
| WO 94/22265 | 9/1994 | WIPO . |

OTHER PUBLICATIONS

Electronics Engineers Handbook, by Donald G. Fink & Donald Christiansen, 3–edition, p. 13–4, 1989.

Image Processing Handbook, by John C. Russ, 2–edition, p. 318, 1995.

*Primary Examiner*—Joseph Mancus
*Assistant Examiner*—Vikkram Bali
*Attorney, Agent, or Firm*—Frommer Lawrence & Haug, LLP.; William S. Frommer

[57] ABSTRACT

A method or apparatus for processing an input frame of image data comprising converting the input frame into a plurality of output frames, the spatial frequency spectrum of each of said plurality of output frames being that of a respective predetermined frequency band of the spatial frequency spectrum of the input frame and applying separately to at least one of said plurality of output frames a respective gain.

24 Claims, 9 Drawing Sheets

LL3,2,1 
LH3,2,1 
LH2,1 
LH1

HL3,2,1 
HL2,1 
HL1

HH3,2,1 
HH2,1 
HH1

| COMPONENT | dc | 1 | 2 | 3 | 4 | 5 | 6 | 7 | 8 | 9 |
|---|---|---|---|---|---|---|---|---|---|---|
| Y | 256 | 338 | 348 | 446 | 746 | 794 | 1246 | 2362 | 1846 | 3483 |
| Cb | 288 | 360 | 525 | 654 | 899 | 2852 | 4558 | 5055 | 53056 | 99999 |
| Cr | 239 | 269 | 349 | 395 | 486 | 1006 | 1325 | 1500 | 5240 | 12356 |

METHOD AND APPARATUS FOR PROCESSING AN INPUT IMAGE

BACKGROUND OF THE INVENTION

1. Field of the Invention

The present invention relates to a method and apparatus for processing an input image, more particularly, by processing different frequency bands of the input image separately.

2. Description of the Related Art

Previously, there have been many techniques of processing image data.

OBJECT AND SUMMARY OF THE INVENTION

It is an object of the present invention to provide an improved image processing technique.

The present invention is based on the principal of dividing an input image into a number of component images each representing a part of the spatial frequency spectrum of the original image. In other words, by converting an input image into a number of component images, each containing the data for only a predetermined bandwidth, and by processing one or more of the component images and then reconstructing an image by summing together all of the component images, the input image can be processed selectively in each of its various bandwidths.

According to the present invention there is provided a method of processing an input frame of image data comprising:

converting the input frame into a plurality of component frames, the spatial frequency spectrum of each of said plurality of component frames being that of a respective predetermined frequency band of the spatial frequency spectrum of the input frame; and applying separately to at least one of said plurality of component frames a respective gain.

According to the present invention there is also provided an apparatus for processing an input frame of image data comprising:

means for converting the input frame into a plurality of component frames, the spatial frequency spectrum of each of said plurality of component frames being that of a respective predetermined frequency band of the spatial frequency spectrum of the input frame; and means for applying separately to at least one of said plurality of component frames a respective gain.

Preferably, the respective gain is calculated according to a selectively variable control value and a weighting value, the weighting value being predetermined for each respective predetermined frequency band according to a model of the human visual system.

For reducing noise in the input frame, the respective gain is preferably non-linear and varies between substantially zero for low input signal levels and substantially unity for high input signal levels.

For sharpening or softening the input frame, the gain is increased for higher predetermined frequency bands to sharpen the input frame and is decreased for the higher predetermined frequency bands to soften the input frame.

Reference to the term "frame" is not limited to video frames formed of pairs of interlaced fields of data and equally applies to a single field of data or any other two dimensional array of image data.

DETAILED DESCRIPTION OF THE PREFERRED EMBODIMENTS

The present invention will be more clearly understood from the following description, given by way of example only, with reference to the accompanying drawings.

The following description is given for the division of an image between logarithmically determined frequency bands. However, it is also possible to use the present invention to produce images where the frequency bands are divided in some other way, for instance linearly.

Figure 1:
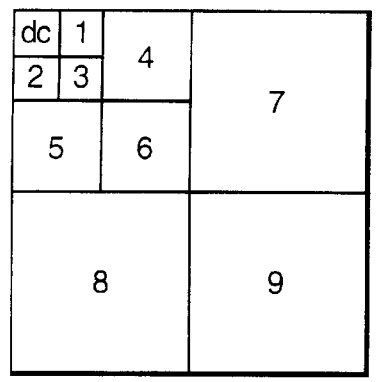
FIG. 1 illustrates an output frame divided into regions having the various frequency bands of an input image.

The reason that logarithmic division is preferred is that it is believed that the human eye has a logarithmic response over the frequency spectrum and FIG. 1 of the accompanying drawings illustrates an input frame divided in this manner.

According to FIG. 1, an input frame of data is converted into an output frame which is divided logarithmically into regions of different spatial frequency. With this logarithmic division, the "DC band" (which is a bandwidth starting at zero frequency) has a bandwidth of approximately ⅛th of the source bandwidth in both the horizontal and vertical directions and therefore in each of those directions uses ⅛th of the pixels used in the original source input frame. The bands marked 1 to 9 are AC components of which bands 1, 4 and 7 contain mostly vertically line structures, bands 2, 5 and 8 contain mostly horizontal line structures and bands 3, 6 and 9 contain mostly diagonal line structures.

In practice, an image divided according to FIG. 1 would show a simplified version of the image in the "DC band" area using only 1/64th of the number of pixels. The AC band areas would show separately the additional detail using more pixels (1/16th and ¼ of the number of pixels of the source input image). By adding the higher frequency information of the AC bands to the "DC band", additional detail is added to the simplified image until, with all of the bands added together, the input image is recovered entirely.

Figure 2:
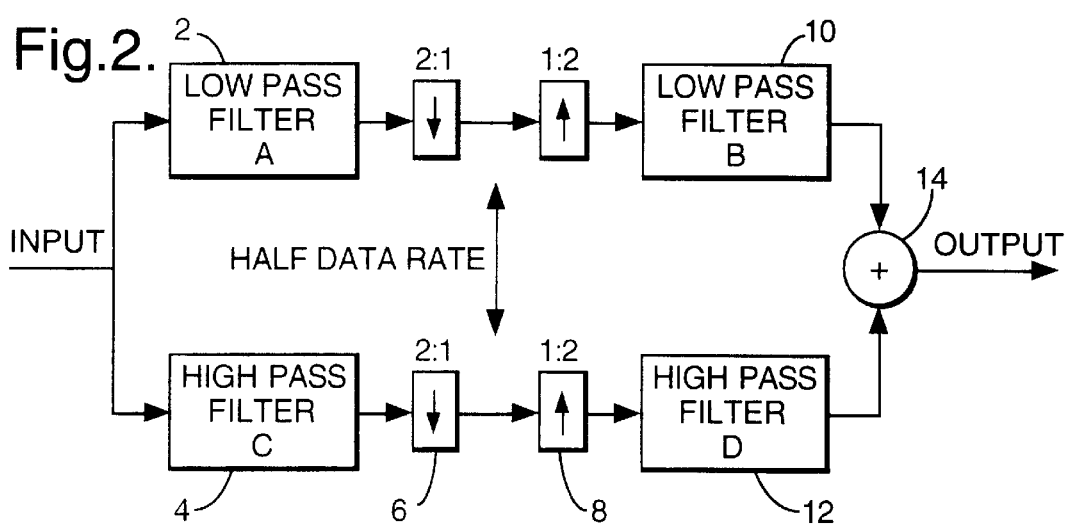
FIG. 2 illustrates an apparatus for dividing an input image between two frequency bands and reconstructing the input image.

FIG. 2 illustrates an apparatus for dividing an input signal into high and low frequency components and then re-combining those components to reform the input signal.

This process uses a special filtering arrangement known as a quadrature mirror filter (QMF) bank having the special property of being able to reproduce the output signal as a perfect replica of the input signal. This process of division may be applied to an input image over a number of stages so as to further divide the input image into the frequency bands described with reference to FIG. 1.

As illustrated in FIG. 2, the input signal is simultaneously low pass 2 and high pass 4 filtered and then decimated 6 by removing every other pixel value. Thus, as an example, an input frame could be divided into two halves, each half having half the number of horizontal pixels, one half having the lower half of the frequency spectrum of the input frame and the other half having the higher half.

In reconstruction, the decimated signals are interpolated 8 by first interleaving zero values with the decimated data and then low 10 or high 12 pass filtering the data to reconstruct the interleaved data. The two filtered signals are then summed 14 to reconstruct the original input frame.

Figure 3:
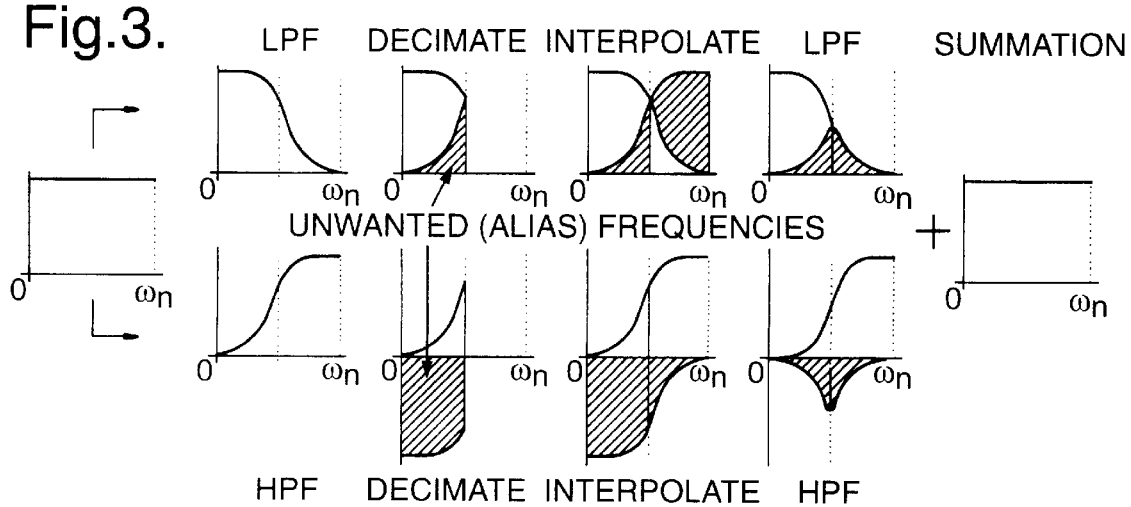
FIG. 3 illustrates the frequency spectrum at various stages of the apparatus of FIG. 2.

FIG. 3 illustrates the frequency spectrum at the various stages of processing of FIG. 2. As illustrated, the decimation process introduces some unwanted alias frequencies and the interpolation mirrors these alias frequencies. However, where the filter banks are designed correctly as a QMF bank, by the following low and high pass filtering and subsequent addition, the unwanted alias frequencies cancel out so that the original input image is reproduced.

Unfortunately, if one of the decimated signals of FIGS. 2 and 3 is further filtered in some way, the symmetry between the aliasing noise of the low and high frequency bands is lost and asymmetric distortion is introduced into the final recombined signal. The problem of asymmetry lies in the process of sub-sampling, since the filters used for decimation are of linear phase.

Figure 4B:
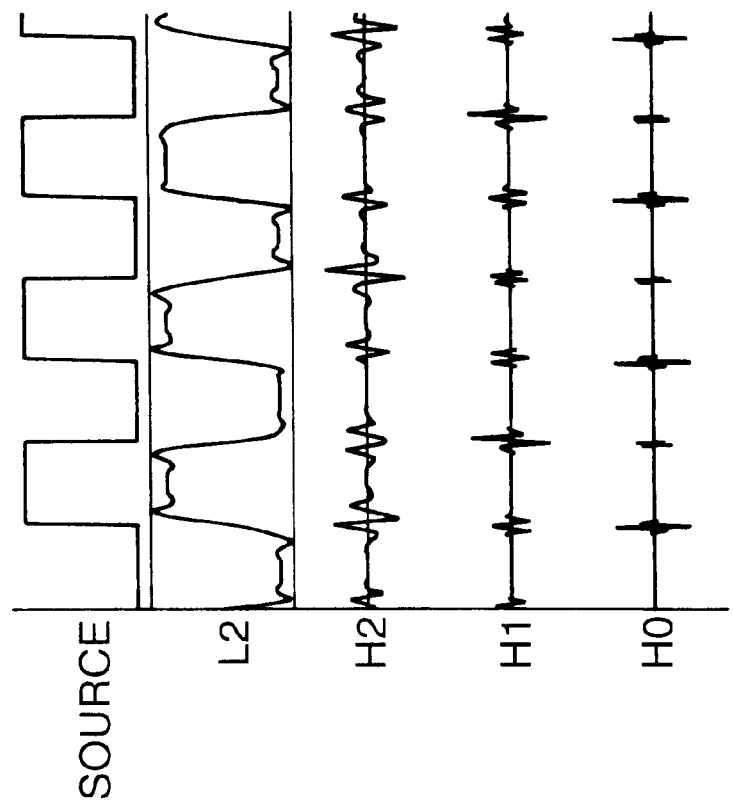
FIGS. 4a and 4b illustrate frequency components of a square wave after decimation by wavelet transformation.
Figure 4A:
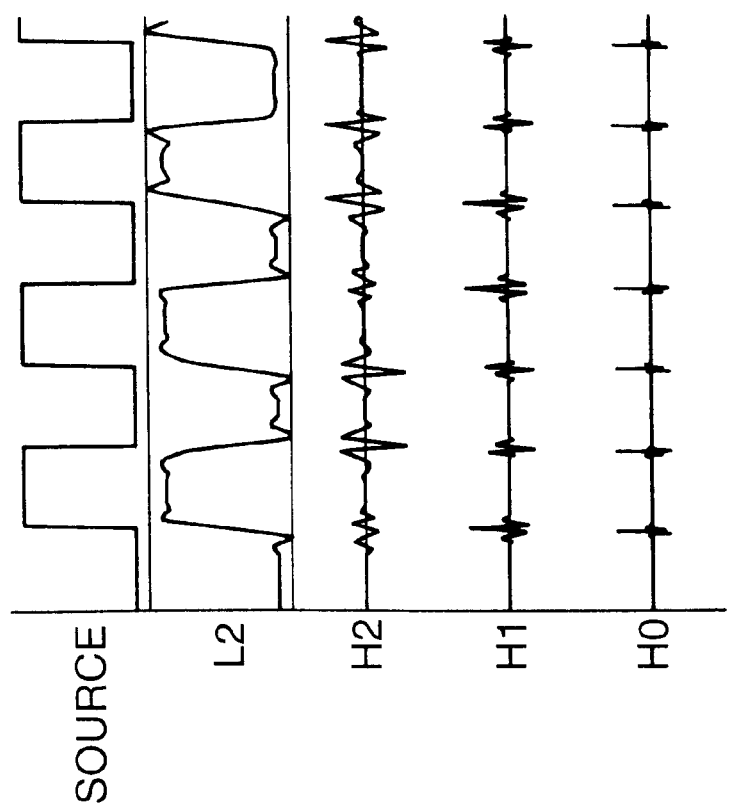

FIGS. 4a and 4b illustrate the signals created by a 3-stage 1 dimensional wavelet transform from an input square wave with a sampling pitch which is misaligned with the sample decimation structure in order to exercise all sub-sampling phases. The filter bank is constructed from a sequence of QMF filter banks of the type illustrated in FIG. 2. Thus, these figures show a square wave with a pitch ensuring eight different edge faces for odd-tap and even-tap decimation filters respectively.

Both FIG. 4a and FIG. 4b show that the edges of the decimated wave forms have portions where the shape is asymmetric. When these AC component frequencies are subjected to gain changes or non-linear processing, then the effects feed back into the reconstructed signal with asymmetric results. Even-tap filters have no sampling offset in the decimation and reconstruction stages, but nevertheless still show edge distortions as in FIG. 4b.

Figure 5:
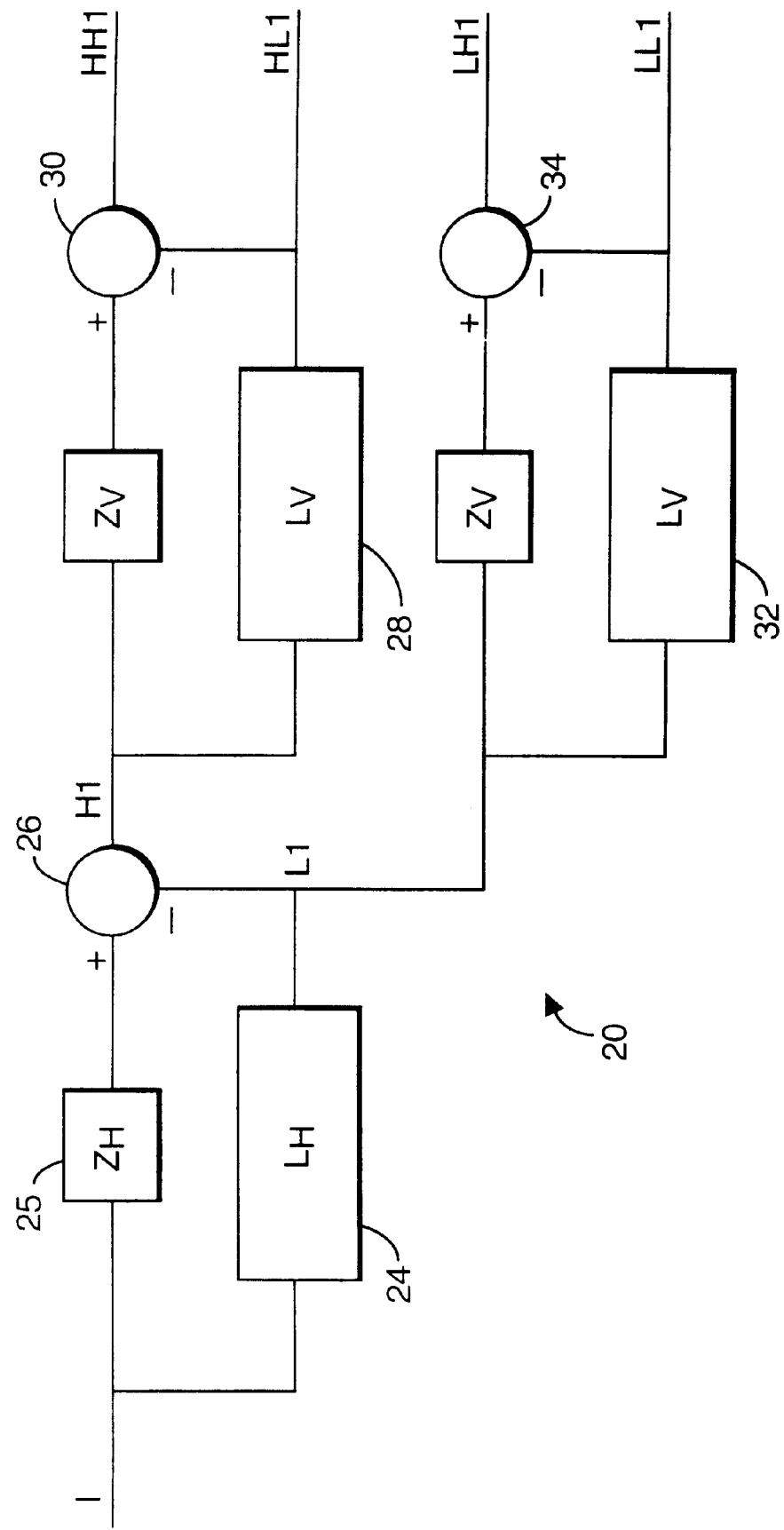
FIG. 5 illustrates an apparatus for dividing an input image between four frequency bands.

FIG. 5 illustrates an apparatus 20 for dividing an input frame into 4 frames, each containing different frequency components. An input image signal I is filtered in a horizontal direction by a low pass filter 24 to produce a signal L1. Signal L1 is then subtracted from the input signal I by subtracter 26 to produce effectively a high pass filtered signal H1. These signals are illustrated, schematically in FIG. 6, noting that each of image signals L1 and H1 are full-resolution image signals like the input image signal.

Next, signal H1 is low pass filtered in a vertical direction by filter 28 to produce signal HL1 and this is subtracted by subtracter 30 from signal H1 to produce signal HH1. Also, signal L1 is low pass filtered in a vertical direction by filter 32 to produce signal LL1 and this is subtracted by subtracter 34 from signal L1 to produce signal LH1.

It will be noted that the apparatus of FIG. 5 also includes delays 25 which are used merely to compensate for the delays introduced by filters 24, 28 and 32 so as to ensure the filtered signals are subtracted from the corresponding unfiltered signals.

Thus, from the source input image frame, four separate full-resolution frames are produced, LL1 having low frequency horizontal and vertical components, LH1 having low frequency horizontal components and high frequency vertical components, HL1 having high frequency horizontal components and low frequency vertical components and HH1 having high frequency horizontal and vertical components.

Clearly, although the apparatus of FIG. 5 is illustrated with two vertical low pass filters and associated subtracters, it is possible to use the same single vertical low pass filter alternately for each of the signals H1 and L1 Also, it is possible to reverse the processing, such that the signals are first vertically filtered and/or it is possible to high pass filter a signal and produce the low pass filtered signal by subtraction.

Note that provided sufficient numerical accuracy is maintained in the subtracter elements, then a simple addition of the four signals LL1, LH1, HL1 and HH1 will result in perfect reconstruction of the input signal I.

In order to further divide the signal in a logarithmic manner it is possible to further divide the signal LL1 having low frequency horizontal and vertical components.

Figure 6:
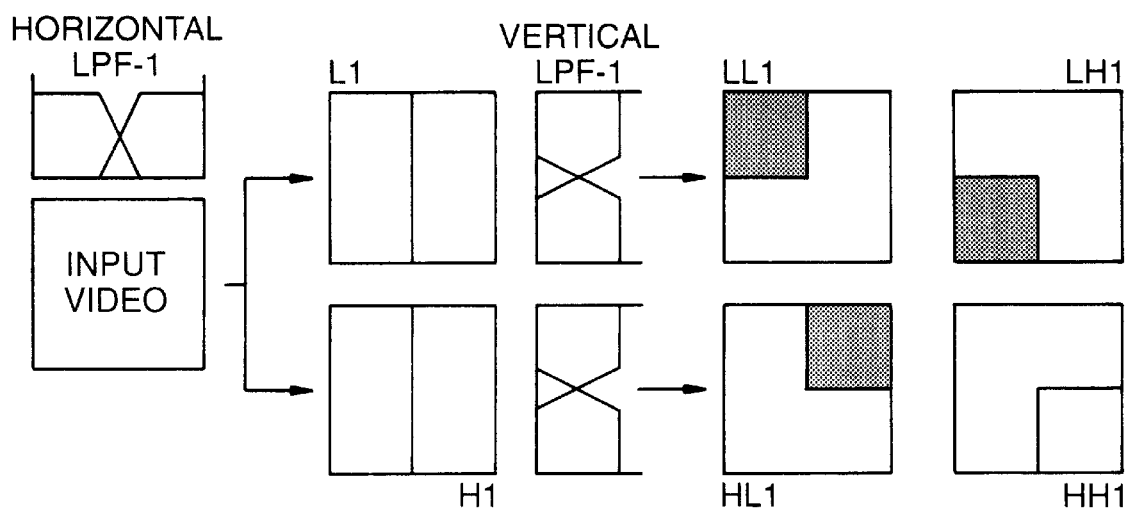
FIG. 6 illustrates schematically the process carried out by the apparatus of FIG. 5.
Figure 7:
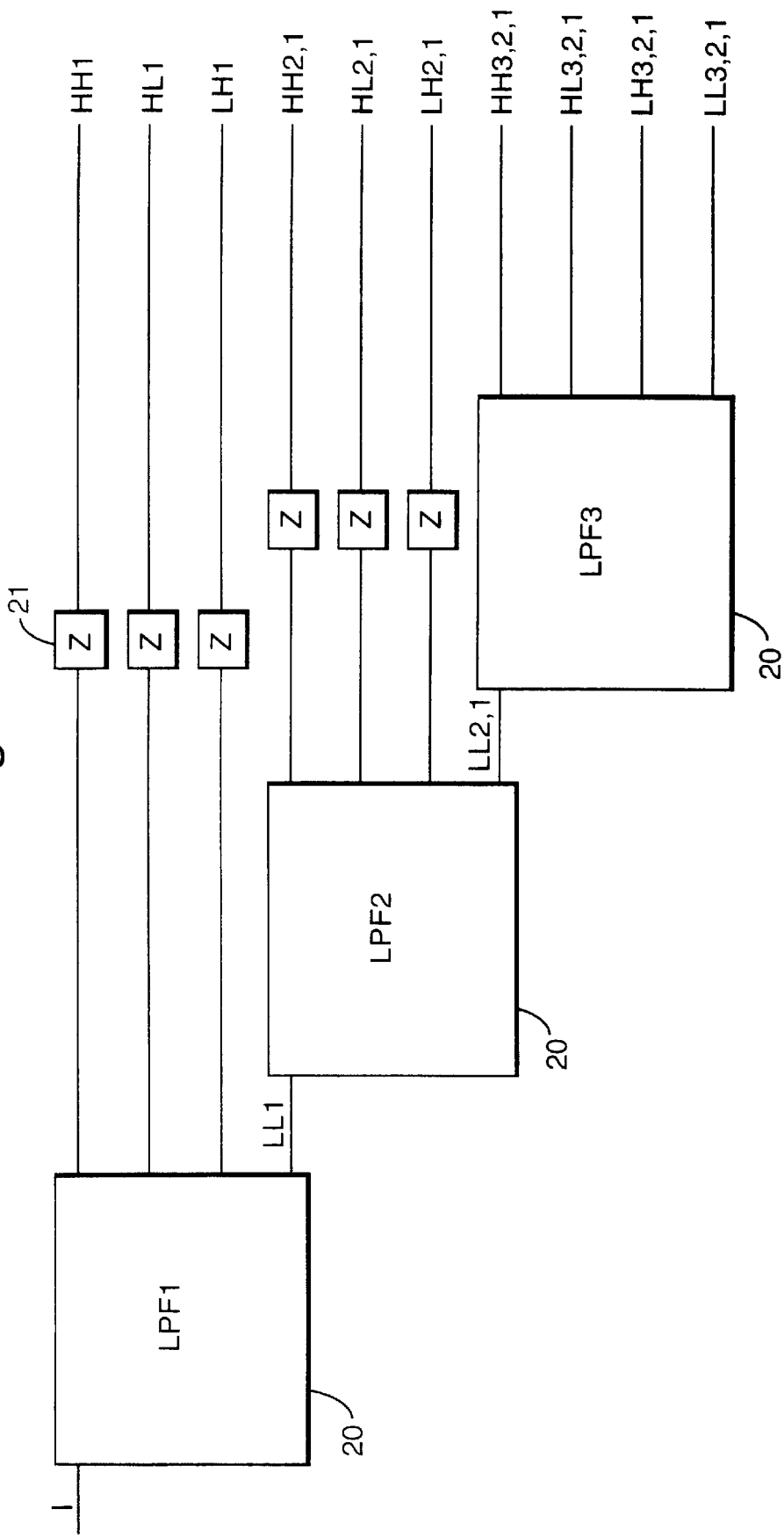
FIG. 7 illustrates an apparatus for dividing an input image between a plurality of frequency bands.
Figure 8:
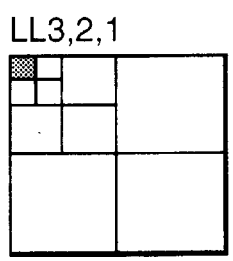
FIG. 8 illustrates schematically the outputs of the apparatus of FIG. 7.
Figure 8:
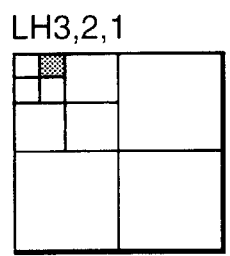
Figure 8:
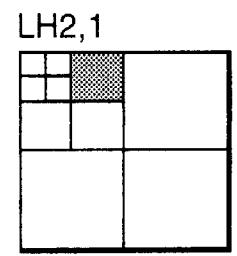
Figure 8:
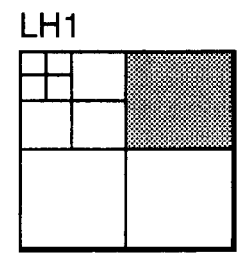
Figure 8:
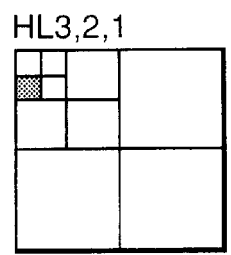
Figure 8:
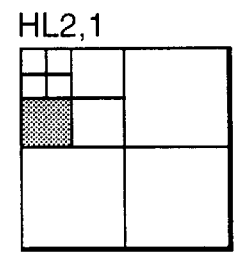
Figure 8:
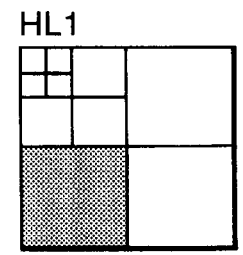
Figure 8:
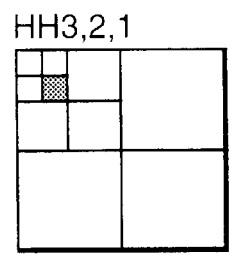
Figure 8:
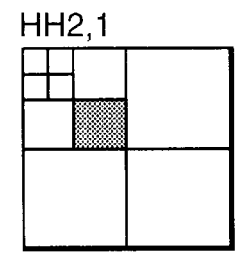
Figure 8:
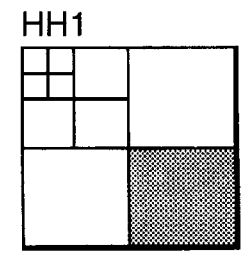

FIG. 7 illustrates how the apparatus 20 of FIG. 5 may be repeated to divide an input image frame into component frames as illustrated in FIG. 8 where, like FIG. 6, FIG. 8 illustrates the division of the input video frame schematically, since each sub-division illustrated contains the same number of pixels as the original input video signal.

In the case of FIG. 7, each apparatus 20 uses a different filter characteristic. Furthermore, delays 21 are preferably used so as to synchronize all of the outputs.

Figure 9:
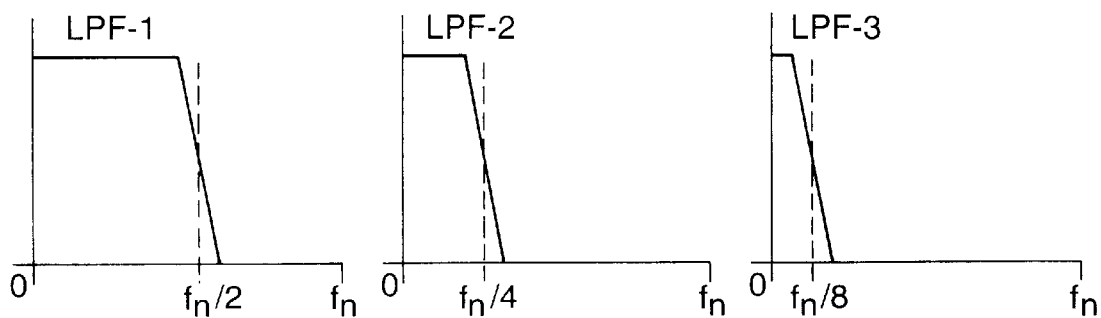
FIG. 9 illustrates preferable filter characteristics for use with the apparatus of FIG. 7.

FIG. 9 illustrates three filter characteristics, LPF-1, LPF-2 and LPF-3 for use in the three-stage division process of FIG. 7. LPF-1 has the highest frequency cut-off at half the Nyquist frequency, LPF-2 has a cut-off frequency equal to a quarter of the Nyquist frequency and LPF-3 has a cut-off frequency equal to an eighth of the Nyquist frequency.

Each filter characteristic is used in both the horizontal and the vertical directions. As illustrated, the relative rate of cut-off for LPF-3 is slower than that for LPF-2, which, in turn, is slower than that for LPF-1. This results from the need to keep the tap length of the filter LPF-3 at a respectively low level and also because experiments have suggested that lower frequency filters need to keep the filter ripples at a reduced level to reduce visible artifacts. This dictates a slower rate of filter cut-off as the filter cut-off frequency is reduced.

Clearly, although FIG. 7 illustrates a duplication of the apparatus 2 using different filter characteristics, it is possible to provide a system which uses the same apparatus 2 at each stage but merely changes the filter characteristic used by the apparatus. Indeed, FIG. 7 is only schematic when the invention is embodied by software.

Once the input signal has been divided as discussed above, it is then possible to process/filter individual component signals.

Before considering details of the processing, it is worth first discussing some characteristics of human vision which are taken into account with preferred embodiments of the present invention.

Firstly, as noted above, it has been found that the human eye is not equally sensitive through the frequency bands. In other words, when a signal is applied equally to a number of different colours at a given spacial frequency, the human eye will register different colour levels due to different sensitivity to different frequencies.

To overcome this, it is possible to consider the visibility of signal components via a model of the Human Visual System (HVS). This provides a set of scale factors for the logarithmic frequency bands such that any changes to data in a frequency band can be scaled according to the frequency band in question.

The changes resulting from image processing are also dependent on the viewing height (i.e. the ratio between the distance from the eye to the image and the height of the image), since this affects the spatial angle of any displayed frequency to the eye. A large value of viewing height causes processing effects to be more apparent to the human eye in the higher frequency band than in the lower bands, whereas a small value of viewing height results in smaller apparent differences between the frequency bands. The reason for this is that as a viewer moves away from a monitor, the spatial angle of a displayed frequency is reduced resulting in a loss of visibility at high displayed frequencies.

Figures 10, 11:
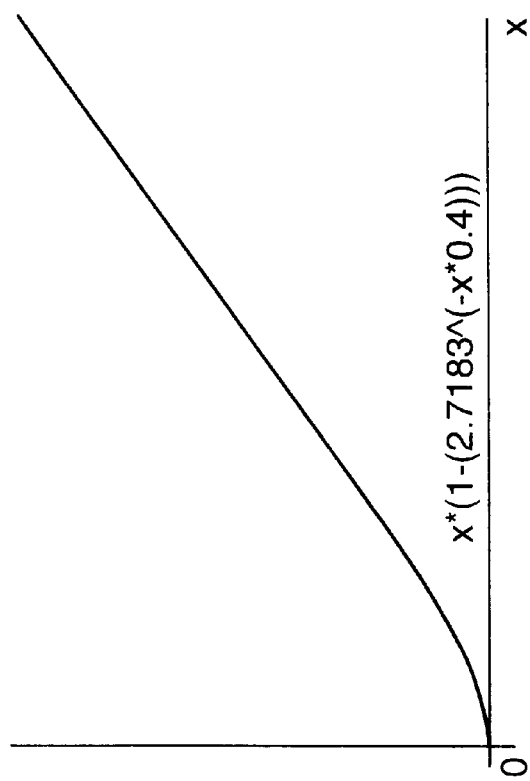
FIG. 10 illustrates an example of a table according to a Human Visual System.
FIG. 11 illustrates a transfer function for use with the present invention.

Thus, for any given viewing height, it is possible to construct a table according to the Human Visual System, i.e. indicating the relative sensitivity of the eye for the various frequency bands. FIG. 10 shows an example of a table for the luminance and two chrominance weighting coefficients at a viewing height of 4H, where H is the height of the display. The reference value is that for the luminance DC value of 256 and all other values are divided by 256 in order to obtain a scaling value for that band. The component frequency bands correspond to those shown in FIG. 1. For completeness, it may be noted that component frequency bands of the same bandwidth but in different directions, eg. (1, 2 and 3), (4, 5 and 6), (7, 8 and 9), have different weighting coefficients. This is due to the fact that there is a different spacing of pixels in different directions.

A first embodiment of the present invention is based on the principle that noise in an image is of relatively low amplitude compared to the image signal. Therefore, in order to reduce noise in an image, there is proposed a transfer function with which, at very low signal levels, the gain is virtually zero, whereas at high levels, the gain is unity, with a transition of gain from zero to unity as the input signal varies from zero to large values.

FIG. 11 illustrates a particular example of a transfer function given by the equation:

$$f(x) = x*(1.0 - e^{-x*k})$$

This equation gives the product of x and $1 - e^{-x*k}$, the latter having a value of 0.0 at X=0.0 rising to 1.0 as X→∞.

As may be seen from FIG. 11, this transfer function results in low values of X being suppressed, whilst high values of X are unchanged. This has the result of suppressing the normally low value noise.

By applying this transfer function separately to each output frequency component signal described above, noise suppression or "noise coring" can be applied selectively to the frequency bands of an input signal. Thus, a separate control can be provided for each frequency band so as to vary the value "k" in the equation above. In this way it is possible to apply noise coring only to selected frequency bands. Similarly, it is possible to apply the noise coring in only one direction. This is particularly useful in video images where horizontal noise occurs as a result of, for instance, line blanking problems.

In a preferred embodiment separate knobs, sliders or similar control means are provided to control the effect of the noise coring by producing control values C. So that each control means has an equal apparent effect, k is chosen to be a product of the control value C for a frequency band and the appropriate human visual system value for that frequency band. In this way, each separate control has an apparent equal effect.

Figure 12:
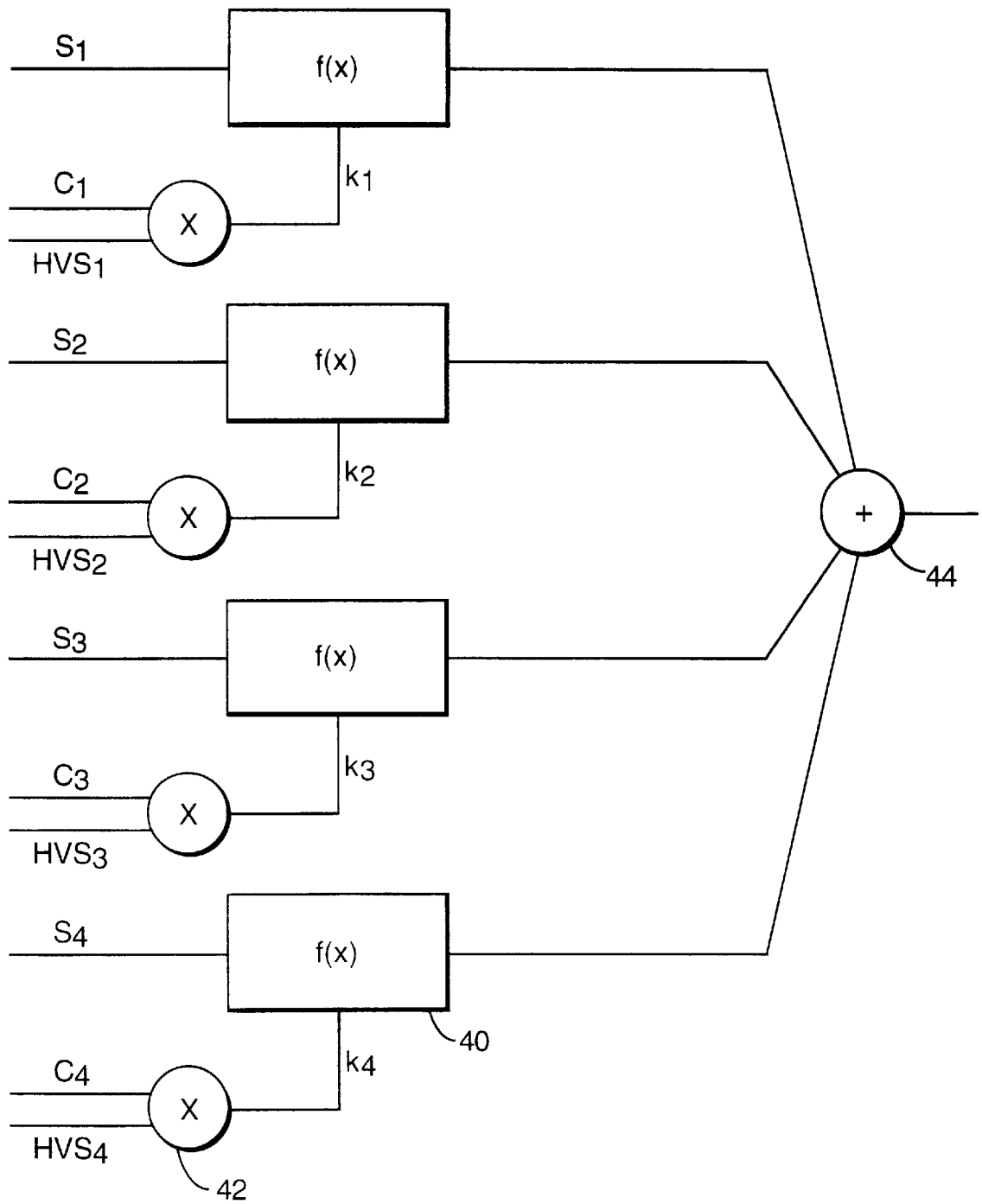
FIG. 12 illustrates an apparatus embodying the invention.

FIG. 12 illustrates an apparatus which processes only four divided frequency bands. Four processing units 40 are provided to process the four respective frequency band components $S_1$ to $S_4$ to with the transfer function f(x).

Each processing unit 40 uses a separately derived value k, multipliers 42 being provided to produce values of K from the product of the respective control values C and HVS gains. The HVS gains may be predetermined for the individual multipliers 42 or, where different visual heights are considered, be provided from a look-up table on the basis of the visual height in question.

Finally, an adder 44 is provided to reconstruct the full frequency spectrum signal.

Using the HVS weighted values/gains, it is also possible to control all of the frequency bands using the same control value C. For each frequency band, the control value C is scaled according to an HVS weighted value/gain and, in this way, the magnitude of noise coring and, therefore, the shape of the curve illustrated in FIG. 11, may be simultaneously altered to varying degrees in the frequency bands so as to have an effect which appears to the human eye to be identical in each frequency band.

In a similar way, it is possible to have respective controls C for all of the horizontal, all of the diagonal and all of the vertical frequency bands, all bands together, each band separately or any other combination of bands.

It may be noted that the transfer function indicated above is always less than unity and that it may be necessary to use some additional gain control to bring normal level signals back to unity gain. Similarly, FIG. 11 shows only the positive transfer characteristics, but the negative characteristic is simply an inverted mirror image of the positive characteristic.

Although the transfer function should vary between substantially zero and unity gain, it is not limited to the specific function given above and could include other functions such as $\sqrt{(1-e^{-x*k})}$, which has the effect of steepening the initial rise from zero, or sin (x*k) in the range −90° to 90°.

According to another embodiment, it is possible to enhance the detail in an image or soften the image. This may be achieved by gain control of the different frequency band signals. Thus, by increasing the gain for the higher frequency bands, edges will be sharpened, whereas, by decreasing them, the image will be softened.

Figure 13:
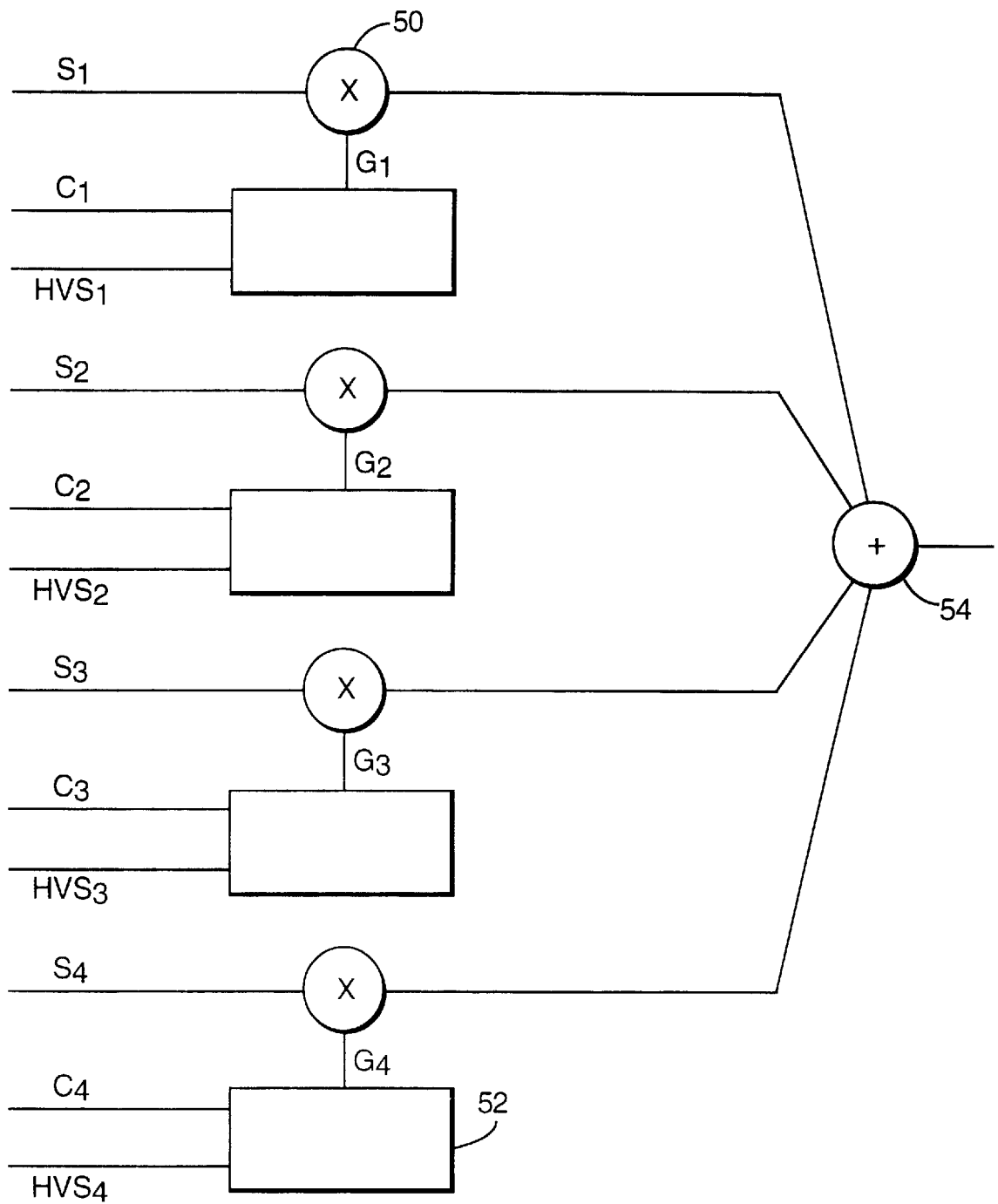
FIG. 13 illustrates an apparatus embodying the invention.

Preferably, this embodiment may be combined with that described above. However, FIG. 13 illustrates an apparatus which processes four divided frequency bands $S_1$ to $S_4$ for image sharpening/softening only. Each frequency band signal $S_1$ to $S_4$ is multiplied in a respective multiplier 50 by a respective gain $G_1$ to $G_4$ calculated in blocks 52. Then, the adder 54 is provided to reconstruct the full frequency spectrum signal.

For similar reasons to those given above the gain control should preferably be weighted by the HVS value for the frequency band being processed such that a gain equation may be expressed as follows:

$$\text{gain} = 10.0^{\wedge}\left[\log\left(\frac{\text{HVS value}}{256}\right) * \log(\text{control value})\right]$$

The control value can vary between 0.1 and 10.0 and is used to vary the overall gain value through the scale factor of the normalised HVS value. If the HVS value is unity, then the gain value is always unity whatever the control value. If the HVS value is V≠1, then the gain value ranges between 1/V and V (eg. if V=2, then the gain value ranges between 0.5 and 2.0). This equation allows the control value to be related to the HVS sensitivity and a control value of 1 will result in a gain value of 1 irrespective of the HVS value thereby ensuring no signal change.

Clearly, once again, although it would be possible to vary the gain individually for each frequency band, it may be preferable to vary simultaneously the gains respectively for the vertical, diagonal and horizontal frequency bands, any, or, indeed, all of the AC frequency bands.

I claim:

1. A method of processing an input frame of image data comprising:
   converting the input frame into a plurality of component frames, the spatial frequency spectrum of each of said plurality of component frames being that of a respective predetermined frequency band of the spatial frequency spectrum of the input frame, with at least one of said component frames being a low frequency component of said input frame in one of said vertical and horizontal directions and a high frequency component of said input frame in the other one of said horizontal and vertical directions; and
   applying separately to at least one of said plurality of components a respective gain.

2. A method according to claim 1,
   wherein the respective gain is at least partly dependent on the frequency band of said at least one of said plurality of component frames, and the respective gain is set according to a selectively variable control value and a weighting value, the weighting value being determined for each respective predetermined frequency band according to a model of the human visual system.

3. A method according to claim 2 wherein, for each predetermined frequency band, a plurality of predetermined weighting values are provided corresponding to a plurality of viewing heights.

4. A method according to claim 1,
   wherein said respective gain is at least partly dependent on the frequency band of said at least one of said component frames, and a single selectively variable control value is provided for controlling a plurality of respective predetermined frequency bands.

5. A method according to claim 1 wherein said respective gain is at least partly dependent on the frequency band of said at least one of said plurality of component frames, wherein the respective gain is calculated according to a selectively variable control value and a weighting value, the weighting value being predetermined for each respective predetermined frequency band according to a model of the human visual system, wherein said respective gain is non-linear and varies between substantially zero for low input signal levels and substantially unity for high input signal levels, wherein the rate of change of the respective gain between zero and unity is at least partly dependent on the frequency band of said at least one of said plurality of component frames wherein the gain equals $1.0-e^{-x*k}$, where x is the value of the component image data and k is a defined value and wherein k is determined from a product of said selectively variable control value and said weighting value.

6. A method according to claim 1 wherein the gain is increased or decreased in relation to a predefined weighting model between the frequency bands to sharpen or soften respectively the input image.

7. A method according to claim 1 further comprising:
   adding the component frames together so as to reconstruct a full frequency spectrum signal.

8. A method of processing an input frame of image data comprising:
   converting the input frame into a plurality of component frames, the spatial frequency spectrum of each of said plurality of component frames being that of a respective predetermined frequency band of the spatial frequency spectrum of the input frame; and
   applying separately to at least one of said plurality of components a respective gain;
   wherein,
   said respective gain is non-linear and varies between substantially zero for low input signal levels and substantially unity for high input signal levels to reduce noise in the input frame.

9. A method according to claim 8 wherein the rate of change of the respective gain between zero and unity is at least partly dependent on the frequency band of said at least one of said plurality of component frames.

10. A method according to claim 9 wherein the gain equals $1.0-e^{-x*k}$, where x is the value of the component image data and k is a defined value.

11. A method of processing an input frame of image data comprising:
    converting the input frame into a plurality of component frames, the spatial frequency spectrum of each of said plurality of component frames being that of a respective predetermined frequency band of the spatial frequency spectrum of the input frame;
    applying separately to at least one of said plurality of component frames a respective gain;
    wherein the gain is increased for higher predetermined frequency bands to sharpen the input frame and is decreased for the higher frequency bands to soften the input frame, and the gain is determined according to the following equation:

gain=10.0^(log[(HVS value)/256]*log (control value).

12. An apparatus for processing an input frame of image data comprising:
    means for converting the input frame into a plurality of component frames, the spatial frequency spectrum of each of said plurality of component frames being that of a respective predetermined frequency band of the spatial frequency spectrum of the input frame; and
    means for applying separately to at least one of said plurality of component frames a respective gain;
    wherein at least one of said component frames is a low frequency component of said input frame in one of said vertical and horizontal directions and a high frequency component of said input frame in the other one of said horizontal and vertical directions.

13. An apparatus according to claim 12 wherein said respective gain is at least partly dependent on the frequency band of said at least one of said plurality of component frames.

14. An apparatus according to claim 13 comprising means for calculating the respective gain from a selectively variable control value and a weighting value, the weighting value being predetermined for each respective predetermined frequency band according to a model of the human visual system.

15. An apparatus according to claim 14 comprising means for storing, for each predetermined frequency band, a plurality of predetermined weighting values corresponding to a plurality of viewing heights.

16. An apparatus according to claim 13 comprising means for providing a single selectively variable for controlling a plurality of respective predetermined frequency bands.

17. An apparatus according to claim 12 wherein said respective gain is at least partly dependent on the frequency band of said at least one of said plurality of component frames, further comprising means for calculating the respective gain from a selectively variable control value and a weighting value, the weighting value being predetermined for each respective predetermined frequency band according to a model of the human visual system and means for storing, for each predetermined frequency band, a plurality of predetermined weighting values corresponding to a plurality of viewing heights, wherein the rate of change of the respective gain between zero and unity is at least partly dependent on the frequency band of said at least one of said plurality of component frames, wherein the gain equals $1.0-e^{-x*k}$, where x is the value of the component image data and k is a defined value and wherein k is determined from a product of said selectively variable control value and said weighting value.

18. An apparatus according to claim 12 for sharpening or softening the input frame wherein the gain is increased for higher predetermined frequency bands to sharpen the input frame and is decreased for the higher predetermined frequency bands to soften the input frame.

19. An apparatus according to claim 18 wherein the gain is increased or decreased logarithmically between the frequency bands to sharpen or soften respectively the input image.

20. An apparatus according to claim 12 further comprising:

means for adding the component frames together so as to reconstruct a full frequency spectrum signal.

21. An apparatus for processing an input frame of image data comprising:

means for converting the input frame into a plurality of component frames, the spatial frequency spectrum of each of said plurality of component frames being that of a respective predetermined frequency band of the spatial frequency spectrum of the input frame; and means for applying separately to at least one of said plurality of component frames a respective gain;

wherein said gain is non-linear and varies between substantially zero for low input signal levels and substantially unity for high input signal levels to reduce noise in the input frame.

22. An apparatus according to claim 21 wherein the rate of change of the respective gain between zero and unity is at least partly dependent on the frequency band of said at least one of said plurality of component frames.

23. An apparatus according to claim 22 wherein the gain equals $1.0-e^{-x*k}$, where x is the value of the component image data and k is a defined value.

24. An apparatus for processing an input frame of image data comprising:

means for converting the input frame into a plurality of component frames, the spatial frequency spectrum of each of said plurality of component frames being that of a respective predetermined frequency band of the spatial frequency spectrum of the input frame; and means for applying separately to at least one of said plurality of component frames a respective gain;

wherein the gain is increased for higher predetermined frequency bands to sharpen the input frame and is decreased for the higher frequency bands to soften the input frame, and the gain is determined according to the following equation:

gain=10.0^(log [(HVS value)/256]*log (control value).

* * * * *